United States Patent
Du et al.

(10) Patent No.: US 11,580,314 B2
(45) Date of Patent: Feb. 14, 2023

(54) DOCUMENT TRANSLATION METHOD AND APPARATUS, STORAGE MEDIUM, AND ELECTRONIC DEVICE

(71) Applicant: Beijing Bytedance Network Technology Co., Ltd., Beijing (CN)

(72) Inventors: Yuzhang Du, Beijing (CN); Peihao Zhu, Beijing (CN); Chongxing Zhou, Beijing (CN); Yiming Chen, Beijing (CN); Mingxuan Wang, Beijing (CN); Lei Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/872,966

(22) Filed: Jul. 25, 2022

(65) Prior Publication Data

US 2022/0374617 A1 Nov. 24, 2022

Related U.S. Application Data

(63) Continuation of application No. PCT/CN2021/099109, filed on Jun. 9, 2021.

(30) Foreign Application Priority Data

Jun. 23, 2020 (CN) .......................... 202010584747.1

(51) Int. Cl.
*G06F 40/58* (2020.01)
*G06F 40/103* (2020.01)
*G06F 40/20* (2020.01)

(52) U.S. Cl.
CPC ............ *G06F 40/58* (2020.01); *G06F 40/103* (2020.01); *G06F 40/20* (2020.01)

(58) Field of Classification Search
CPC .......... G06F 40/58; G06F 40/44; G06F 40/45; G06F 40/47
See application file for complete search history.

(56) References Cited

U.S. PATENT DOCUMENTS 4,805,132 A * 2/1989 Okamoto ................ G06F 40/58
715/236
4,821,230 A * 4/1989 Kumano ................ G06F 40/55
704/6

(Continued)

FOREIGN PATENT DOCUMENTS

| CN | 101382935 A | 3/2009 |
|---|---|---|
| CN | 104714943 A | 6/2015 |

(Continued)

OTHER PUBLICATIONS

International Search Report Issued in corresponding International Application No. PCT/CN2021/099109 dated Sep. 7, 2021.

*Primary Examiner* — Lamont M Spooner
(74) *Attorney, Agent, or Firm* — ArentFox Schiff LLP

(57) ABSTRACT

A document translation method includes: displaying a source text display region, a translated text region, and an editing region, wherein textual content in a document to be translated is displayed in the source text display region, and reference translated text for the textual content is displayed in the translated text region; and providing a translated text recommendation from the reference translated text according to input from a user within the editing region. The method further includes: displaying the translation recommendation in the editing area as a translation result, if a confirmation operation for the translation recommendation is detected; and receiving a translation inputted by the user that is different from the translation recommendation and displaying the translation inputted by the user in the editing (Continued)

area as the translation result, if a non-confirmation operation for the translation recommendation is detected.

19 Claims, 3 Drawing Sheets

(56) References Cited

U.S. PATENT DOCUMENTS

| | | | | |
|---|---|---|---|---|
| 4,831,529 A * | 5/1989 | Miike | | G06F 40/58 704/4 |
| 5,091,876 A * | 2/1992 | Kumano | | G06F 40/253 715/764 |
| 5,214,583 A * | 5/1993 | Miike | | G06F 40/47 704/4 |
| 5,349,368 A * | 9/1994 | Takeda | | G06F 40/55 704/7 |
| 5,608,622 A * | 3/1997 | Church | | G06F 40/40 715/236 |
| 6,598,015 B1 * | 7/2003 | Peterson | | G06F 40/45 704/5 |
| 7,536,294 B1 * | 5/2009 | Stanz | | G06F 9/454 707/999.203 |
| 2005/0149316 A1 * | 7/2005 | Ushioda | | G06F 40/47 704/2 |
| 2008/0147378 A1 * | 6/2008 | Hall | | G06F 40/45 704/4 |
| 2010/0115424 A1 * | 5/2010 | Young | | G06F 40/58 715/753 |
| 2012/0022852 A1 * | 1/2012 | Tregaskis | | G06F 40/47 704/E11.001 |
| 2016/0147746 A1 * | 5/2016 | Park | | G06F 40/10 704/7 |
| 2016/0267074 A1 * | 9/2016 | Nozue | | G10L 15/32 |
| 2016/0343272 A1 * | 11/2016 | Roche | | G09B 5/04 |
| 2018/0158365 A1 * | 6/2018 | Roche | | G09B 17/003 |
| 2018/0203849 A1 * | 7/2018 | Geib | | G06F 40/30 |
| 2019/0034080 A1 * | 1/2019 | Nagel | | G06F 3/04886 |
| 2021/0374362 A1 * | 12/2021 | Shin | | G06F 40/58 |

FOREIGN PATENT DOCUMENTS

| | | |
|---|---|---|
| CN | 107885729 A | 4/2018 |
| CN | 109710948 A | 5/2019 |
| CN | 110162798 A | 8/2019 |
| CN | 111666776 A | 9/2020 |
| WO | 2007068960 A2 | 6/2007 |
| WO | 2019098107 A1 | 5/2019 |

* cited by examiner

DOCUMENT TRANSLATION METHOD AND APPARATUS, STORAGE MEDIUM, AND ELECTRONIC DEVICE

This application is a continuation of International Application No. PCT/CN2021/099109, filed on Jun. 9, 2021, which claims priority to Chinese Patent Application No. 202010584747.1, titled "DOCUMENT TRANSLATION METHOD AND APPARATUS, STORAGE MEDIUM, AND ELECTRONIC DEVICE", filed on Jun. 23, 2020 with the China National Intellectual Property Administration, both of which are incorporated herein by reference in their entireties.

FIELD

The present disclosure relates to the field of machine translation, and in particular to a document translation method and apparatus, a storage medium, and an electronic device.

BACKGROUND

Nowadays, with the developed machine translation technology, simple translation tasks can be carried out by means of machine translation and manual proofreading, i.e., using Machine Translation Post-Editing (MTPE) mode. However, under the current MTPE technology, compatibility between machine translation and manual proofreading is not good enough, resulting in the document translation still being qualitatively inferior to manual translation. These problems seriously restrict the development of MTPE. In translation scenarios that require high accuracy of translation results, manual translation is usually used for document translation, and the problems of low efficiency and slow speed of manual translation still cannot be solved.

SUMMARY

This summary section is provided to introduce the concept briefly, and the concept is described in detail in embodiments hereinafter. This summary section is neither intended to identity key features or necessary features of the claimed technical solutions, nor intended to limit the scope of the claimed technical solutions:

In a first aspect, a document translation method is provided according to an embodiment of the present disclosure. The method includes:

displaying an original text display area, a translated text area and an editing area, wherein textual content in a document to be translated is displayed in the original text display area, and a reference translation of the textual content is displayed in the translated text area; and providing a translation recommendation from the reference translation, following an input of a user in the editing area;

wherein the method further includes: displaying the translation recommendation in the editing area as a translation result, in a case that a confirmation operation of the user for the translation recommendation is detected, or in a case that a confirmation operation of the user for the translation recommendation is not detected and a translation inputted by the user that is different from the translation recommendation is received, displaying the translation inputted by the user in the editing area as the translation result.

In a second aspect, a document translation apparatus is provided according to the present disclosure. The apparatus includes:

a display module configured to display an original text display area, a translated text area and an editing area, wherein textual content in a document to be translated is displayed in the original text display area, and a reference translation of the textual content is displayed in the translated text area; and a recommending module configured to provide a translation recommendation from the reference translation, following an input of a user in the editing area.

The recommending module is further configured to display the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, display the translation inputted by the user in the editing area as the translation result.

In a third aspect, a computer-readable medium is provided according to the present disclosure. The computer-readable medium stores computer programs thereon that, when executed by a processor, perform the method according to the first aspect of the present disclosure.

In a fourth aspect, an electronic device is provided according to the present disclosure. The electric device includes:

a storage device storing computer programs thereon; and a processor configured to execute the computer programs stored in the storage device, to perform the method according to the first aspect of the present disclosure.

According to the above technical solutions, at least the following technical effects can be achieved. The translation recommendation from the reference translation can be provided based on the input of the user, and the user can directly use the translation recommendation as the translation result through a confirmation operation, thereby reducing the time taken in the user input. The efficiency and quality of translation can be improved by the combination of the accuracy of manual translation and the efficiency of machine translation in the present disclosure.

Other features and advantages of the present disclosure are described in detail in specific embodiments hereinafter.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale. In the drawings.

DETAILED DESCRIPTION

Figure 1:
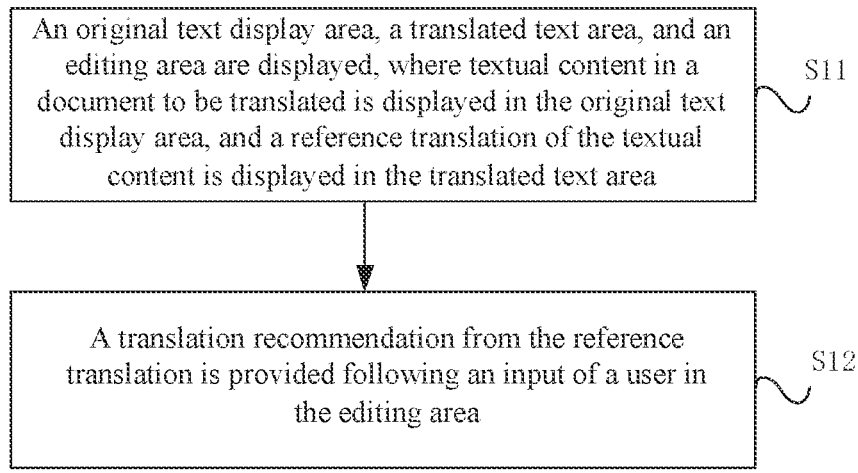
FIG. 1 is a flowchart of a document translation method according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or an omitted step that is not shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different apparatuses, modules or units, and are not used to limit an sequential order or interdependence of the functions performed by the apparatuses, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

Names of messages or information interacted between multiple apparatuses in the embodiments of the present disclosure are illustrative rather than limit the scope of the message or information.

FIG. 1 is a flowchart of a document translation method according to an embodiment of the present disclosure. The method may be applied to a terminal, a server and other independently operated electronic device. In addition, the method may also be applied to translation systems. In this case, the steps in the method may be implemented by the cooperation of multiple devices in the translation systems. For example, S11 shown in FIG. 1 may be performed by a terminal, and S12 may be performed by a server. As shown in FIG. 1, the document translation method includes steps S11 to S12.

In step S11, an original text display area, a translated text area, and an editing area are displayed, where textual content in a document to be translated is displayed in the original text display area, and a reference translation of the textual content is displayed in the translated text area.

In step S12, a translation recommendation from the reference translation is provided following an input of a user in the editing area.

Based on the translation recommendation, the method according to the embodiment of the present disclosure includes: displaying the translation recommendation in the editing area as a translation result, in the case that a confirmation operation of the user for the translation recommendation is detected; or receiving a translation inputted by the user that is different from the translation recommendation and displaying the translation inputted by the user in the editing area as the translation result, in the case that a non-confirmation operation of the user for the translation recommendation is detected. Optionally, the method may further include: updating the reference translation in the translated text area based on the translation inputted by the user.

In an implementation, the confirmation operation described above may be an operation of a user on a preset shortcut key. For example, the user expresses an intention of accepting the translation recommendation by clicking the shortcut key. Therefore, the translation recommendation may be displayed in the editing area as the translation result, in the case that the user's operation of clicking the shortcut key is detected. It should be noted that the action of displaying the translation recommendation in the editing area as the translation result will be regarded as the input of the user in the editing area described in step S12. In other words, in this case, step S12 indicates that in the method according to the embodiment of the present disclosure, the next translation recommendation (the next translation recommendation may be a translation following the provided translation recommendation in the reference translation) from the reference translation may be provided in response to the translation recommendation provided this time being displayed in the editing area as a translation result.

In an embodiment, the case that a non-confirmation operation of the user for the translation recommendation is detected may be the case of detecting that the translation inputted by the user is inconsistent with the translation recommendation provided this time. In this case, the method according to the embodiment of the present disclosure may include receiving a translation inputted by the user that is different from the translation recommendation, and displaying the translation inputted by the user in the editing area as a translation result. Furthermore, the method may further include: updating the reference translation in the translated text area based on the translation inputted by the user. It should also be noted that the translation inputted by the user that is different from the translation recommendation will be regarded as the input of the user in the editing area described in step S12. In other words, in this case, step S12 indicates that in the method according to the embodiment of the present disclosure, the next translation recommendation from the reference translation updated based on the translation inputted by the user may be provided in response to the user inputting the translation different from the translation recommendation in the editing area. For example, the translation recommendation provided this time is "my", and the translation inputted by the user is detected to be a translation "I" different from the translation recommendation "my". In this case, the reference translation is updated based on the translation "I", and the next translation recommendation for a translation following the translation "I" is provided from the updated reference translation.

With the above method, the translation recommendation from the reference translation can be provided based on the input by the user, and the user can directly use the translation recommendation as the translation result through a confirmation operation, thereby reducing the time taken in the user input. The efficiency and quality of translation can be improved by the combination of the accuracy of manual translation and the efficiency of machine translation in the present disclosure.

In order to make those skilled in the art better understand the technical solutions according to the embodiment of the present disclosure, the document translation method according to the embodiment of the present disclosure will be described in detail below.

Optionally, the document to be translated in step S11 may be textual content directly copied and pasted by the user, or may be a text document, a picture document, etc. uploaded by the user. The present disclosure does not limit the format of the document to be translated. For documents in a format such as the picture document, character recognition may be performed on the picture document to obtain the textual content in the picture document.

Optionally, providing the translation recommendation in step S12 may include: distinctively displaying the translation recommendation from the reference translation in the translated text area. In this case, distinctive display of the translation recommendation in the translated text area may be removed, in the case that the confirmation operation of the user for the translation recommendation is detected.

The distinctive display can be performed by the means of bold font, highlighted font, different-colored characters, different-colored background, shading effects, etc., which can distinctively display the translation recommendation. In a possible implementation, the distinctive display may be performed in a display mode different from the inputted translation. For example, in the editing area, the inputted translation may be displayed in bold font, and the translation recommendation may be displayed in normal font. Alternatively, the inputted translation can be displayed in black font, and the translation recommendation is displayed in gray font, etc. In the case that the confirmation operation of the user for the translation recommendation is detected, the display mode of the translation recommendation can be adjusted to be the same as the display mode of the inputted translation. For example, the inputted translation may be displayed in bold font, and the translation recommendation may be displayed in normal font. In the case that the confirmation operation of the user is detected, the translation recommendation is adjusted to be displayed in bold font.

In a possible implementation, the confirmation operation may be an input operation of the user on a shortcut key of an electronic device. For example, the electronic device can be a mobile phone, and the shortcut key can be a virtual key on the display area of the mobile phone or a physical key (e.g., a volume key) of the mobile phone. The user can operate the above-mentioned shortcut key to adopt the translation recommendation. In the case that a triggering operation of the user for the above shortcut key is detected, the translation recommendation may be displayed in the editing area as the translation result. The electronic device may also be a computer, and the shortcut key may be a designated or custom key on a keyboard or mouse of the computer (for example, an alt key of the keyboard, and a side key of the mouse).

The confirmation operation may also be a gesture confirmation operation obtained and recognized by the camera, such as nodding, blinking and making a preset gesture; or a voice confirmation operation obtained and recognized by the microphone.

In a possible implementation, the translation recommendation from the reference translation includes at least one of a word, a phrase, or a sentence.

A manner of providing the translation recommendation is described in detail hereinafter.

When translating the textual content, the user can perform an input in the editing area with reference to the reference translation displayed in the translated text area (It should be noted that the input herein includes the input of characters, e.g., typing letters and words, and also includes key operation input, such as clicking on the editing area). The translation recommendation from the reference translation may be provided.

For example, in the case that the textual content is "当铃声响起时，艾莉走进了学校" and the reference translation thereof is "When the bell rang, Allie entered the school", the translation recommendation "When" (or a more coarse-grained translation recommendation such as "When the bell rang") from the reference translation may be provided after the user clicks the edit area or inputs a character "W" in the edit area.

The user can adopt the translation recommendation through a confirmation operation, and the translation recommendation from the reference translation may be provided continually by using the confirmation operation as an input operation in the editing area. For example, in the case that the confirmation operation of the user for "When" is detected, "When" is displayed in the editing area as the translation result, and a next translation recommendation "the" is provided to the user.

In the case that the non-confirmation operation of the user for the translation recommendation is detected, a translation inputted by the user that is different from the translation recommendation is received, and the reference translation in the translated text area is updated based on the translation inputted by the user. The non-confirmation operation may be a preset operation representing non-confirmation (for example, clicking a preset button or performing a preset action), or may refer to other situations other than the aforementioned confirmation operation. For example, the confirmation operation has not been performed within a preset time or an operation to continue input is performed.

In some embodiments, the reference translation of the textual content "当铃声响起时，艾莉走进了学校" is "When the bell rang, Allie entered the school.".

After a clicking input operation of the user on the editing area is received, the translation recommendation "When" from the reference translation is provided. In response to the user's confirmation operation, the translation recommendation "When" is displayed in the editing area as the translation result, and it is continued to provide the next translation recommendation "the" for the user. The input "c" of the user that is different from the translation recommendation is received, when the translation recommendation "entered" is provided. Then, the reference translation can be updated to be "When the bell rang, Allie came in the school.", based on the translation inputted by the user, and the translation recommendation "came" may be provided to the user.

The reference translation and translation recommendation may be provided by machine translation e.g., a deep learning translation model). It should be noted that when a reference translation that conforms to the textual content cannot be generated based on the translation inputted by the user in the editing area, an error correction can be performed on the characters of the translation inputted by the user, based on the pre-stored dictionary content. The reference translation may be updated based on the error-corrected translation.

It should be noted that, although the present disclosure takes a case that the translation language is English and the original text is in Chinese as an example, the present disclosure does not limit the translation language and the language of the original text. Various combinations, such as the original text in the present disclosure in classical Chinese and the translation in vernacular Chinese, or the original text in Japanese and the translation in English, may be included in the present disclosure.

In a possible implementation, the original text display area is an editable area, that is, the textual content in the original text display area is editable. In view of this, the method may further include: updating the reference translation in the translated text area, in response to a modification operation of the user for the textual content in the original text display area.

In some embodiments, the reference translation of the textual content "当铃声响起时, 艾莉走进了学校" is "When the bell rang, Allie entered the school.".

The reference translation in the translated text area can be updated to "When the bell rang, Allie entered the classroom." after the user modifies the textual content "学校" in the original text display area to "教室".

In a possible implementation, the textual content in the document to be translated may be segmented to obtain multiple segmented contents. Respective original text display areas, translated text areas and editing areas correspond to the segmented contents are displayed. A segmented content is displayed in the corresponding original text display area, and the reference translation of the segmented content is displayed in the corresponding translated text area.

In some implementations, the textual content can be segmented manually by the user. For example, segment breakers are inserted at a position where the textual content is required to be segmented. The textual content may also be segmented based on at least one of semantic information of the textual content or segment breaker information in the document to be translated. For example, a semantic segmentation model can be used to segment according to the textual content. The sentences with the same semantics can be displayed in a natural segment. Optionally, segmentation may also be performed in a preset manner, when the text distribution in the picture document satisfies a preset format. For example, if the characters in one picture document are arranged aggregately in multiple positions, the characters in the picture document can be recognized, and the characters at the same position in the picture can be displayed in one segment.

Figure 2:
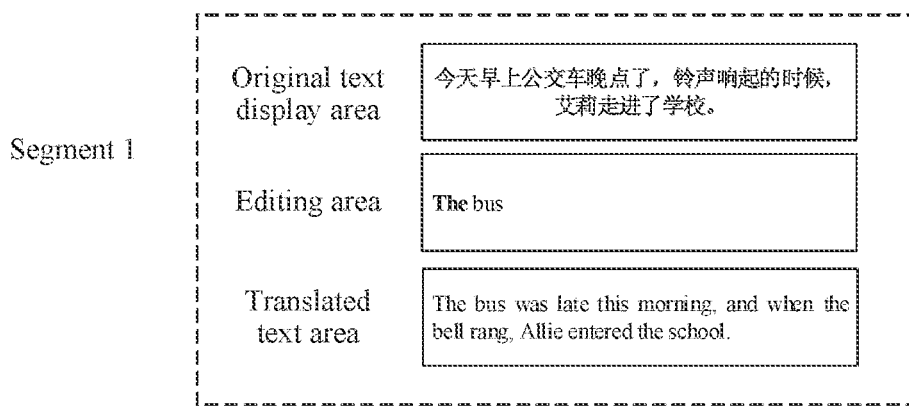
FIG. 2 is a schematic diagram of a translation interface according to an embodiment of the present disclosure.
Figure 2:
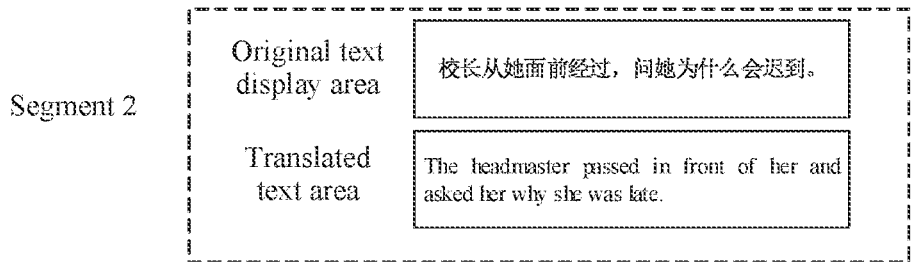

FIG. 2 is a schematic diagram of a possible translation interface. Textual content of the document to be translated is displayed in the original text display area, and the original text display area is displayed above the translated text area and the editing area. Different segments correspond to the respective display text display areas, translated text areas and editing areas. The translation may be performed independently at the respective areas of each segment, which will not be updated due to modifications in other areas. The user can input the translation in the editing area, or modify the textual content in the original text display area.

As shown in the presentation box of the lower segment 2 of FIG. 2, in one possible implementation, the editing area may be displayed in response to a selection operation of the user for the segment, and the editing area may be hidden before the user selects the segment.

Figure 3:
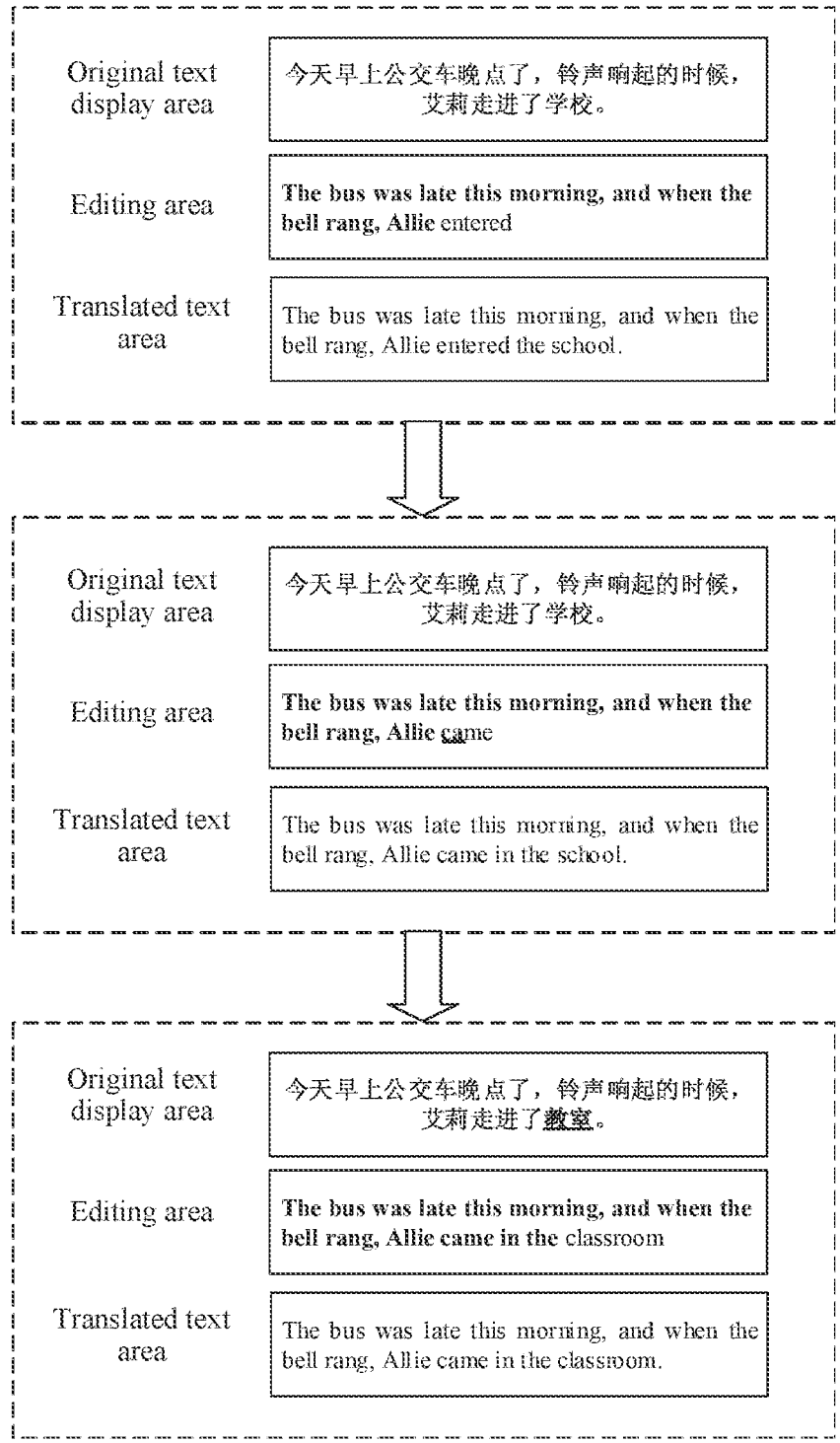
FIG. 3 is a schematic diagram of a translation interface according to an embodiment of the present disclosure.

FIG. 3 is a schematic diagram of a possible translation interface. As shown in the uppermost area of FIG. 3, the original text display area may be located above the translated text area and the editing area. The textual content may be obtained and then be translated. The reference translation may be displayed in the translated text area. The translation recommendation from the reference translation may be provided in the editing area based on the input of the user in the editing area. The translation recommendations that have been confirmed as translation results or the translations that have been inputted by the user are displayed in bold font. The translation recommendation which is displayed is shown in gray ordinary font. As shown in the middle area of FIG. 3, a non-confirmation operation of the user inputting the translation in the editing area (such as inputting a translation different from the translation recommendation in the editing area) is detected, and the reference translation is updated based on the translation inputted by the user (the characters displayed in bold and underlined are characters inputted by the user). The translation recommendation from the updated reference translation is displayed for the user. As shown in the bottom area of FIG. 3, after the user adopts the translation recommendation from the updated reference translation the translation recommendation is displayed in the editing area as the translation result. If the user edits the textual content in the original text display area (the characters displayed in bold and underlined are characters modified by the user), the reference translation is updated based on the textual content edited by the user, and the translation recommendation from the reference translation is provided.

In a possible implementation, the textual content and the translation result of the textual content by the user may be used as training samples. The training samples are used to train a deep learning translation model corresponding to the user, to update the deep learning translation model in order to make the deep learning translation model more in line with the user's usage habits. For example, if the user is accustom to translating the word "电话" into "phone" instead of "telephone", the deep learning translation model corresponding to the user can be updated based on the user's translation result after the translation result is used by the user for many times. In this way, in subsequent use, the word "电话" will be translated into "phone" instead of "telephone" to make it more in line with the user's usage habits.

In a possible implementation, the translation result may be exported as a translation document in a document format specified by the user, and a download service may be provided to the user. The method may further generate a translation document in a typesetting format consistent with the document to be translated which is uploaded by the user, thereby saving the user's typesetting time. For example, the page margins in the document to be translated are 3 cm in the upper part, 2.5 cm in the lower part, 2.8 cm in the left part, and 2 cm in the right part. The title is in boldface with a size of 22 pt and in the center, the subtitle is in boldface with a size of 16 pt, and the body is in Chinese Song font with a size of 14 pt. In this case, the page margins may be set to be the same as those of the document to be translated when the translation document is generated. The translation result corresponding to the textual content of the title may be adjusted to be in boldface with a size of 22 pt and in the center. The translation result corresponding to the textual content of the subtitle may be adjusted to be the boldface with a size of 16 pt. The translation result corresponding to the textual content of the body may be adjusted to be in a default English font with a size of 14 pt. The segment format, the number of carriage returns, page numbers, page headers, etc. may be adjusted to be consistent with those of the document to be translated, and the translation document may be exported in the document format specified by the user, such as word or pelf format.

According to the above technical solutions, at least the following technical effects can be achieved. The translation recommendation from the reference translation can be provided based on the input of the user, and the user can directly use the translation recommendation as the translation result through the confirmation operation, thereby reducing the time taken in the user input. The efficiency and quality of translation can be improved by the combination of the accuracy of manual translation and the efficiency of machine translation in the present disclosure.

Figure 4:
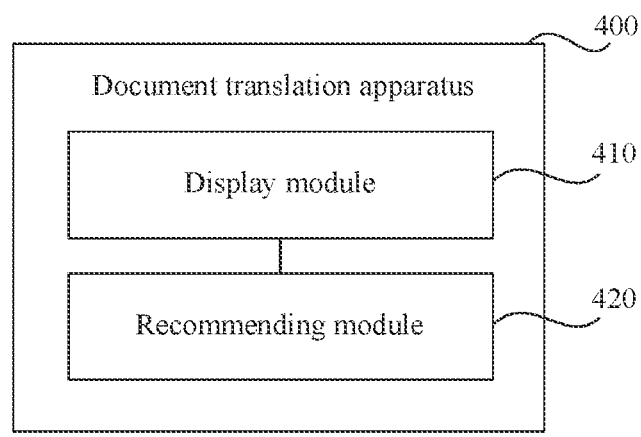
FIG. 4 is a block diagram of a document translation apparatus according to an embodiment of the present disclosure.

FIG. 4 is a block diagram of a document translation apparatus according to an embodiment of the present disclosure. As shown in FIG. 4, the document translation apparatus 400 includes a display module 410 and a recommending module 420.

The display module 410 is configured to display an original text display area, a translated text area and an editing area, where textual content in a document to be translated is displayed in the original text display area, and a reference translation of the textual content is displayed in the translated text area.

The recommending module 420 is configured to provide a translation recommendation from the reference translation, following an input of a user in the editing area.

The recommending module 420 is further configured to display the translation recommendation in the editing area as a translation result, in the case that a confirmation operation of the user for the translation recommendation is detected; or receive a translation inputted by the user that is different from the translation recommendation, and display the translation inputted by the user in the editing area as the translation result, in the case that a non-confirmation operation of the user for the translation recommendation is detected.

Optionally, the recommending module is further configured to update the reference translation in the translated text area based on the translation inputted by the user.

Optionally, the recommending module further includes a display sub-module, configured to distinctively display the translation recommendation from the reference translation in the translated text area; and remove a distinctive display of the translation recommendation in the translated text area, in the case that the confirmation operation of the user for the translation recommendation is detected.

Optionally, the display sub-module is configured to display the translation recommendation in the editing area in a display mode different from inputted translation and display the translation recommendation as the translation result in the editing area in the same display mode as the inputted translation, in the case that the confirmation operation of the user for the translation recommendation is detected.

Optionally, the translation recommendation includes at least one of a word, a phrase, or a sentence.

Optionally, the recommending module is further configured to display the translation recommendation in the editing area as the translation result in response to a triggering operation of the user for a shortcut key on an electronic device.

Optionally, the apparatus further includes: a modification module, configured to update the reference translation in the translated text area in response to a modification operation of the user for the textual content in the original text display area.

Optionally, the display module further includes a segmentation sub-module, configured to segment the textual content in the document to be translated to obtain segmented contents. The display module is further configured to display respective original text display areas, translated text areas and editing areas corresponding to the segmented contents. Each of the segmented contents is displayed in a corresponding original text display area, and the reference translation of the segmented content is displayed in a corresponding translated text area.

Optionally, the segmentation sub-module is configured to segment the textual content in the document to be translated to obtain the segmented contents, based on at least one of semantic information of the textual content or segment breaker information in the document to be translated.

The functions of the above modules have been described in detail in the method steps in the previous embodiment, which will not be repeated herein.

According to the above technical solutions, at least the following technical effects can be achieved: the translation recommendation from the reference translation can be provided based on the input of the user, and the user can directly use the translation recommendation as the translation result through the confirmation operation, thereby reducing the time taken in the user input. The efficiency and quality of translation can be improved by the combination of the accuracy of manual translation and the efficiency of machine translation in the present disclosure.

Hereinafter reference is made to FIG. 5 which shows a schematic structural diagram of an electronic device 500 suitable for implementing the embodiments of the present disclosure. The terminal device in the embodiments of the present disclosure may include, but not limited to, mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 5 is exemplary, and is not intended to limit the function and scope of the embodiments of the present disclosure.

Figure 5:
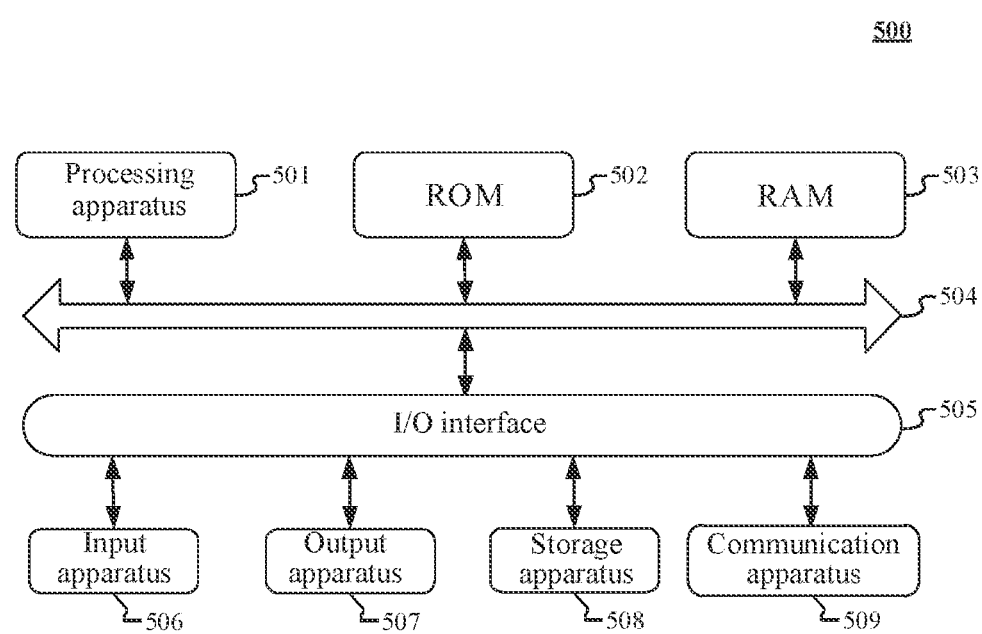
FIG. 5 is a block diagram of an electronic device according to an embodiment of the present disclosure.

As shown in FIG. 5, the electronic device 500 may include a processing apparatus (such as a central processor and a graphic processor) 501. The processing apparatus may perform various appropriate actions and processing by executing programs stored in a read-only memory (ROM) 502 or programs uploaded from a storage apparatus 508 to a random access memory (RAM) 503. Various programs and data required for operations of the electronic device 500 are also stored in the RAM 503. The processing apparatus 501, the ROM 502 and the RAM 503 are connected to each other through the bus 504. An input/output (I/O) interface 505 is also connected to the bus 504.

Generally, the following components are connected to the I/O interface 505: an input apparatus 506 such as a touch screen, a touch panel, a keyboard, a mouse, a camera, a microphone, an accelerometer, and gyroscope; an output apparatus 507 such as a liquid crystal display (LCD), a loudspeaker and a vibrator; a storage apparatus 508 such as a magnetic tape and a hard disk; and a communication apparatus 509. The communication apparatus 509 may allow the electronic device 500 to communicate with other device in a wired or wireless manner to exchange data. Although FIG. 5 shows the electronic device 500 provided with various apparatuses, it should be understood that not all shown apparatuses are necessary. Alternatively, more or less apparatuses may be included.

According to embodiments of the present disclosure, a process described in the flowchart above may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 509, installed from the storage apparatus 508 or installed from the ROM 502. The computer program is executed by the processing apparatus 501 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. When executing the one or more programs, the electronic device is instructed to perform the following operations: displaying an original text display area, a translated text area and an editing area, where textual content in a document to be translated is displayed in the original text display area, and a reference translation of the textual content is displayed in the translated text area; providing a translation recommendation from the reference translation based on an input of a user in the editing area; where the electronic device is instructed further to display the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, displaying the translation inputted by the user in the editing area as the translation result.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instruction(s) for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware-based system for performing specified functions or operations, or may be implemented by a combination of dedicated hardware and computer instructions.

Modules involved in the embodiments of the present disclosure may be implemented by software or hardware. Names of the modules do not limit the modules in a certain case. For example, the displaying module may be described as "a module displaying an original text display area, a translated text area and an editing area".

The functions described above herein may be partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

According to one or more embodiments of the present disclosure, a document translation method is provided according to a first example. The method includes: displaying an original text display area, a translated text area and an editing area, wherein textual content in a document to be translated is displayed in the original text display area, and a reference translation of the textual content is displayed in the translated text area; and providing a translation recommendation from the reference translation, following an input of a user in the editing area, wherein the method further includes: displaying the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, displaying the translation inputted by the user in the editing area as the translation result.

According to one or more embodiments of the present disclosure, a method similar to that in the first example is provided according to a second example. The method further includes: updating the reference translation in the translated text area based on the translation inputted by the user.

According to one or more embodiments of the present disclosure, a method similar to that in the first example is provided according to a third example. The providing a translation recommendation from the reference translation includes: distinctively displaying the translation recommendation from the reference translation in the translated text area; and the method further includes: removing a distinctive display of the translation recommendation in the translated text area, in the case that the confirmation operation of the user for the translation recommendation is detected.

According to one or more embodiments of the present disclosure, a method similar to that in the third example is provided according to a fourth example. The providing a translation recommendation from the reference translation includes: displaying the translation recommendation in the editing area in a display mode different from inputted translation; and the displaying the translation recommendation in the editing area as a translation result, in a case that a confirmation operation of the user for the translation recommendation is detected includes: displaying the translation recommendation as the translation result in the editing area in the same display mode as the inputted translation, in the case that the confirmation operation of the user for the translation recommendation is detected.

According to one or more embodiments of the present disclosure, a method similar to that in the first example is provided according to a fifth example. The translation recommendation includes at least one of a word, a phrase, or a sentence.

According to one or more embodiments of the present disclosure, a method similar to that in the first example is provided according to a sixth example. The displaying the translation recommendation in the editing area as a translation result, in a case that a confirmation operation of the user for the translation recommendation is detected includes: displaying the translation recommendation in the editing area as the translation result in response to a triggering operation of the user for a shortcut key on an electronic device.

According to one or more embodiments of the present disclosure, a method similar to that in the first example to the sixth example is provided according to a seventh example. The method further comprises: updating the reference translation in the translated text area in response to a modification operation of the user for the textual content in the original text display area.

According to one or more embodiments of the present disclosure, a method similar to that in the first example to the sixth example is provided according to an eighth example. The displaying an original text display area, a translated text area and an editing area includes: segmenting the textual content in the document to be translated to obtain segmented contents; and displaying respective original text display areas, translated text areas and editing area corresponding to the segmented contents, wherein each of the segmented contents is displayed in a corresponding original text display area, and the reference translation of the segmented content is displayed in a corresponding translated text area.

According to one or more embodiments of the present disclosure, a method similar to that in the eighth example is provided according to a ninth example. The segmenting the textual content in the document to be translated to obtain segmented contents comprises: segmenting the textual content in the document to be translated to obtain the segmented contents, based on at least one of semantic information of the textual content or segment breaker information in the document to be translated.

According to one or more embodiments of the present disclosure, a document translation apparatus is provided according to a tenth example. The apparatus includes: a display module configured to display an original text display area, a translated text area and an editing area, wherein textual content in a document to be translated is displayed in the original text display area, and a reference translation of the textual content is displayed in the translated text area; and a recommending module configured to provide a translation recommendation from the reference translation, following an input of a user in the editing area; wherein the recommending module is further configured to display the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, display the translation inputted by the user in the editing area as the translation result.

According to one or more embodiments of the present disclosure, an apparatus similar to that in the tenth example is provided according to an eleventh example. The recommending module is further configured to update the reference translation in the translated text area based on the translation inputted by the user According to one or more embodiments of the present disclosure, an apparatus similar to that in the tenth example is provided according to a twelfth example. The recommending module further includes a display sub-module, configured to distinctively display the translation recommendation from the reference translation in the translated text area; and remove a distinctive display of the translation recommendation in the translated text area, in the case that the confirmation operation of the user for the translation recommendation is detected.

According to one or more embodiments of the present disclosure, an apparatus similar to that in the twelfth example is provided according to a thirteenth example. The display sub-module is configured to display the translation recommendation in the editing area in a display mode different from inputted translation; and display the translation recommendation as the translation result in the editing area in the same display mode as the inputted translation, in the case that the confirmation operation of the user for the translation recommendation is detected.

According to one or more embodiments of the present disclosure, an apparatus similar to that in the tenth example is provided according to a fourteenth example. The translation recommendation includes at least one of a word, a phrase, or a sentence.

According to one or more embodiments of the present disclosure, an apparatus similar to that in the tenth example is provided according to a fifteenth example. The recommending module is further configured to display the translation recommendation in the editing area as the translation result in response to a triggering operation of the user for a shortcut key on an electronic device.

According to one or more embodiments of the present disclosure, an apparatus similar to that in the tenth example to the fifteenth example is provided according to a sixteenth example. The apparatus further includes a modification module, configured to update the reference translation in the translated text area in response to a modification operation of the user for the textual content in the original text display area.

According to one or more embodiments of the present disclosure, an apparatus similar to that in the tenth example to the fifteenth example is provided according to a seventeenth example. The display module further includes a segmentation sub-module, configured to segment the textual content in the document to be translated to obtain the segmented contents; and the display module is further configured to display respective original text display areas, translated text areas and editing areas corresponding to the segmented contents, wherein each of the segmented contents is displayed in a corresponding original text display area, and the reference translation of the segmented content is displayed in a corresponding translated text area.

According to one or more embodiments of the present disclosure, an apparatus similar to that in the seventeenth example is provided according to an eighteenth example. The segmentation sub-module is configured to segment the textual content in the document to be translated to obtain the segmented contents, based on at least one of semantic information of the textual content or segment breaker information in the document to be translated.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims. For the apparatus embodiments, operations of the various modules have been described in detail in the related method embodiments, and details are not described herein.

The invention claimed is:

1. A document translation method, comprising:
    displaying an original text display area, a translated text area and an editing area, wherein textual content in a document to be translated is displayed in the original text display area, and a reference translation of the textual content is displayed in the translated text area; and
    providing a translation recommendation from the reference translation, following an input of a user in the editing area;
    wherein the document translation method further comprises:
    displaying the translation recommendation in the editing area as a translation result, in a case that a confirmation operation of the user for the translation recommendation is detected; or
    in a case that a confirmation operation of the user for the translation recommendation is not detected and a translation inputted by the user that is different from the translation recommendation is received, displaying the translation inputted by the user in the editing area as the translation result.

2. The document translation method of claim 1, further comprising:
    updating the reference translation in the translated text area, based on the translation inputted by the user.

3. The document translation method of claim 1, wherein providing a translation recommendation from the reference translation comprises:
- distinctively displaying the translation recommendation from the reference translation in the translated text area; and
- the method further comprises: removing a distinctive display of the translation recommendation in the translated text area, in the case that the confirmation operation of the user for the translation recommendation is detected.

4. The document translation method of claim 1, wherein providing a translation recommendation from the reference translation comprises:
- displaying the translation recommendation in the editing area in a display mode different from inputted translation; and
- displaying the translation recommendation in the editing area as a translation result, in a case that a confirmation operation of the user for the translation recommendation is detected comprises:
- displaying the translation recommendation as the translation result in the editing area in the same display mode as the inputted translation, in the case that the confirmation operation of the user for the translation recommendation is detected.

5. The document translation method of claim 1, wherein the translation recommendation comprises at least one of a word, a phrase, or a sentence.

6. The document translation method of claim 1, wherein displaying the translation recommendation in the editing area as a translation result, in a case that a confirmation operation of the user for the translation recommendation is detected comprises:
- displaying the translation recommendation in the editing area as the translation result, in response to a triggering operation of the user for a shortcut key on an electronic device.

7. The document translation method of claim 1, further comprising:
- updating the reference translation in the translated text area, in response to a modification operation of the user for the textual content in the original text display area.

8. The document translation method of claim 1, wherein displaying an original text display area, a translated text area and an editing area comprises:
- segmenting the textual content in the document to be translated to obtain segmented contents; and
- displaying respective original text display areas, translated text areas and editing areas corresponding to the segmented contents, wherein each of the segmented contents is displayed in a corresponding original text display area, and the reference translation of the segmented content is displayed in a corresponding translated text area.

9. The document translation method of claim 8, wherein segmenting the textual content in the document to be translated to obtain segmented contents comprises:
- segmenting the textual content in the document to be translated to obtain the segmented contents, based on at least one of semantic information of the textual content or segment breaker information in the document to be translated.

10. A document translation apparatus, comprising:
- a memory storing computer programs thereon; and
- a processor configured to execute the computer programs stored in the memory, to
- display an original text display area, a translated text area and an editing area, wherein textual content in a document to be translated is displayed in the original text display area, and a reference translation of the textual content is displayed in the translated text area; and
- provide a translation recommendation from the reference translation, following an input of a user in the editing area,
- wherein the processor is configured to execute the computer programs stored in the memory, further to display the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, display the translation inputted by the user in the editing area as the translation result.

11. The document translation apparatus of claim 10, wherein the processor is configured to execute the computer programs stored in the memory, further to
- update the reference translation in the translated text area, based on the translation inputted by the user.

12. The document translation apparatus of claim 10, wherein the processor is configured to execute the computer programs stored in the memory, further to:
- distinctively display the translation recommendation from the reference translation in the translated text area; and
- remove a distinctive display of the translation recommendation in the translated text area, in the case that the confirmation operation of the user for the translation recommendation is detected.

13. The document translation apparatus of claim 10, wherein the processor is configured to execute the computer programs stored in the memory, further to:
- display the translation recommendation in the editing area in a display mode different from inputted translation; and
- display the translation recommendation as the translation result in the editing area in the same display mode as the inputted translation, in the case that the confirmation operation of the user for the translation recommendation is detected.

14. The document translation apparatus of claim 10, wherein the translation recommendation comprises at least one of a word, a phrase, or a sentence.

15. The document translation apparatus of claim 10, wherein the processor is configured to execute the computer programs stored in the memory, further to:
- display the translation recommendation in the editing area as the translation result, in response to a triggering operation of the user for a shortcut key on an electronic device.

16. The document translation apparatus of claim 10, wherein the processor is configured to execute the computer programs stored in the memory, further to
- update the reference translation in the translated text area, in response to a modification operation of the user for the textual content in the original text display area.

17. The document translation apparatus of claim 10, wherein the processor is configured to execute the computer programs stored in the memory, further to:
- segment the textual content in the document to be translated to obtain segmented contents; and
- display respective original text display areas, translated text areas and editing areas corresponding to the segmented contents, wherein each of the segmented contents is displayed in a corresponding original text display area, and the reference translation of the segmented content is displayed in a corresponding translated text area.

18. The document translation apparatus of claim 17, wherein the processor is configured to execute the computer programs stored in the memory, further to:
  segment the textual content in the document to be translated to obtain the segmented contents, based on at least one of semantic information of the textual content or segment breaker information in the document to be translated.

19. A non-transitory computer-readable medium, wherein computer programs are stored in the computer-readable medium, and
  when executing the computer programs, a processor performs a document translation method, and the document translation method comprises:
  displaying an original text display area, a translated text area and an editing area, wherein textual content in a document to be translated is displayed in the original text display area, and a reference translation of the textual content is displayed in the translated text area; and
  providing a translation recommendation from the reference translation, following an input of a user in the editing area;
  wherein the document translation method further comprises:
  displaying the translation recommendation in the editing area as a translation result, in a case that a confirmation operation of the user for the translation recommendation is detected; or
  in a case that a confirmation operation of the user for the translation recommendation is not detected and a translation inputted by the user that is different from the translation recommendation is received, displaying the translation inputted by the user in the editing area as the translation result.

* * * * *